Aug. 30, 1966 F. C. BADKE 3,269,412
MULTI-POSITION DISTRIBUTING AND REGULATING VALVE
Filed Jan. 27, 1964 2 Sheets-Sheet 1
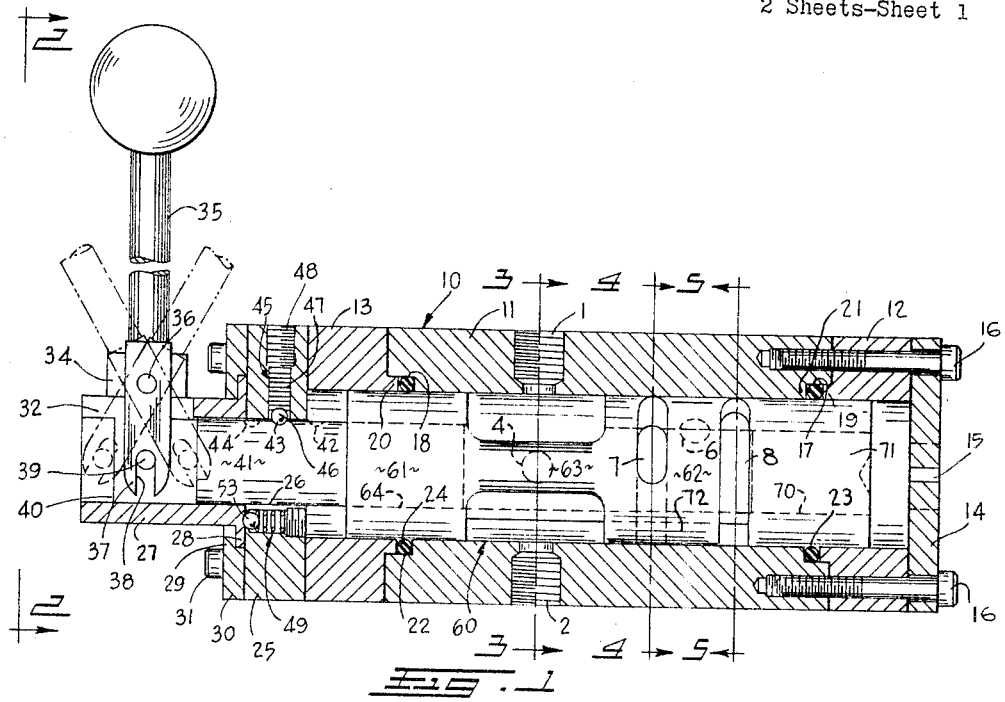
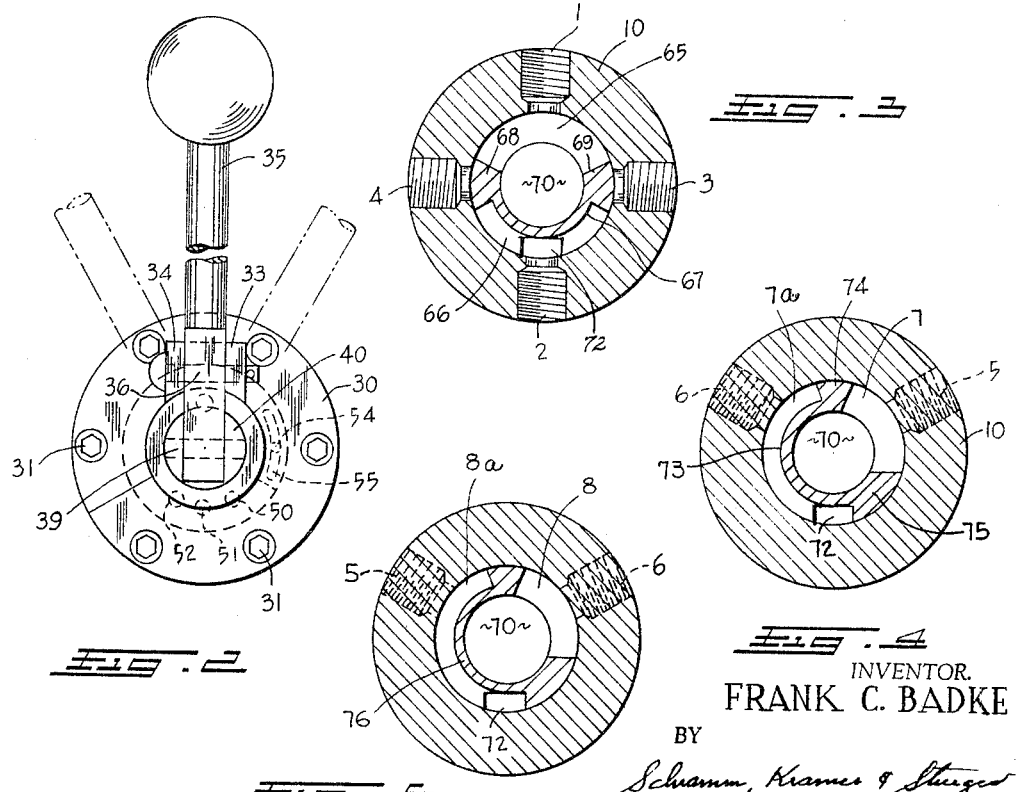
INVENTOR.
FRANK C. BADKE
BY
Schramm, Kramer & Sturges
ATTORNEYS Aug. 30, 1966   F. C. BADKE   3,269,412
MULTI-POSITION DISTRIBUTING AND REGULATING VALVE
Filed Jan. 27, 1964   2 Sheets-Sheet 2
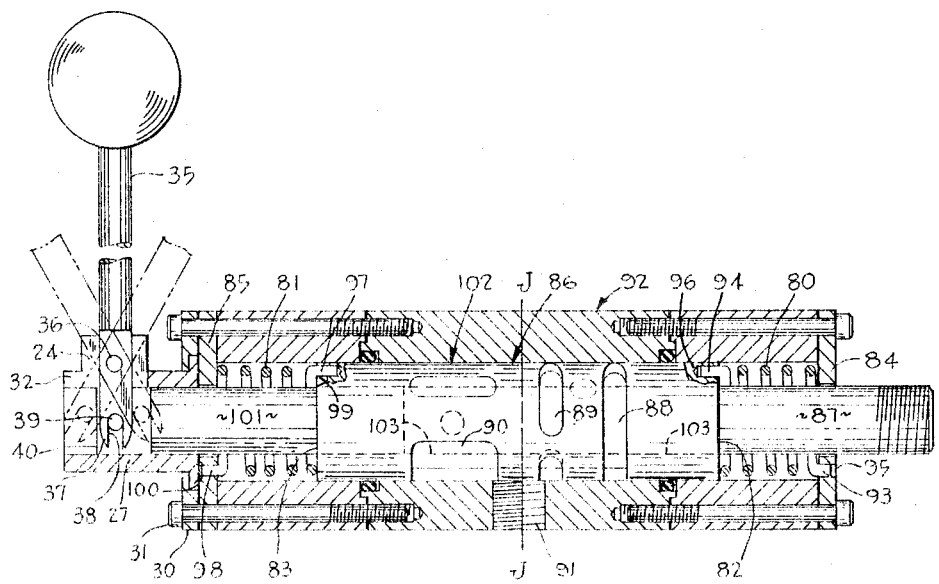
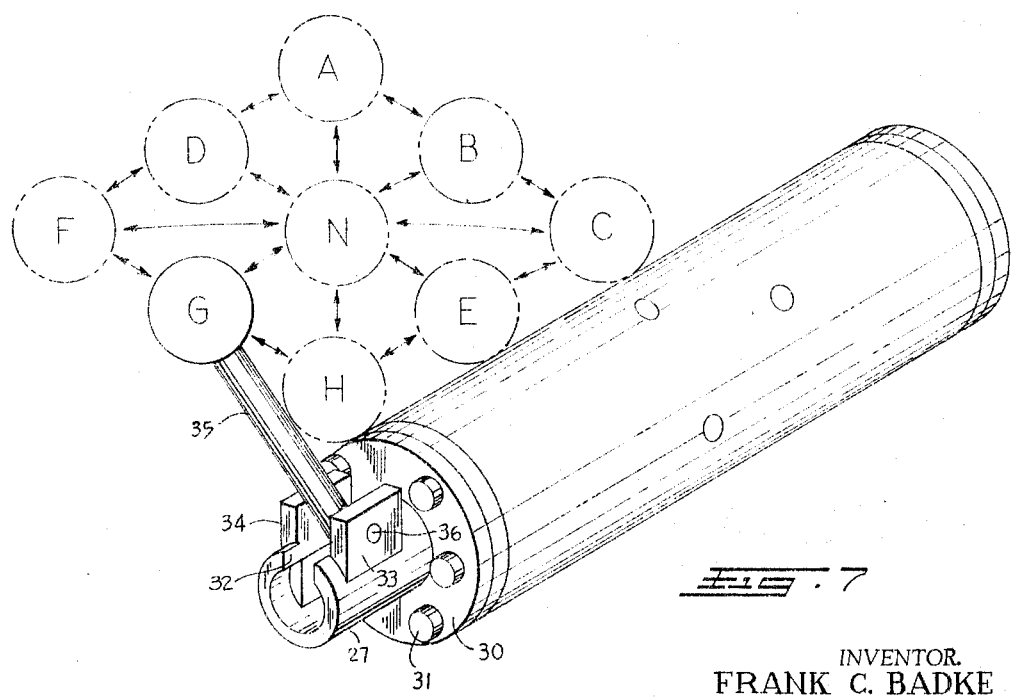
INVENTOR.
FRANK C. BADKE
BY
*Schramm, Kramer & Sturges*
ATTORNEYS United States Patent Office 3,269,412
Patented August 30, 1966

3,269,412
MULTI-POSITION DISTRIBUTING AND
REGULATING VALVE
Frank C. Badke, 33955 McAfee Drive, Solon 39, Ohio
Filed Jan. 27, 1964, Ser. No. 340,205
8 Claims. (Cl. 137—625.17)

This invention relates to a fluid distributing and regulating valve, and more particularly to a control valve wherein a slidable, rotatable piston is positioned by means of an adjusting handle in such positions as to have different ports coacting with each other through recesses or passageways defined by the piston and the cylinder wall.

The problem to date has been to construct a valve, simple in fabrication and operation, for distributing and regulating the fluid flow between a desired number and variety of ports. The relative simplicity of fabrication and operation of the valve of this invention will become apparent as the following description proceeds with reference to the accompanying drawings, which are illustrative of a preferred embodiment of this invention, and not means to limit the scope thereof.

Briefly stated, the invention is an improvement in a sliding piston distributing and regulating valve assembly, which includes a hollow cylinder having ports in at least two transverse planes adapted for selective communication therein, a piston having a hollow core and a drainage channel extending longitudinally along the surface of said piston for communication between said port including planes and means for rotating and axially sliding said piston. The improvement includes a piston having a first pair of non-communicating arcuate recesses adapted to communicate with said ports in said first plane, one of said arcuate recesses communicating with said hollow core of said piston, and said second recess communicating with said drainage channel. It also includes a plurality of pairs of non-communicating recesses, also in said piston, in a plurality of planes axially displaced from the plane of said first pair of arcuate recesses. Each of the recesses in each pair is adapted to communicate with a single cylinder port in said hollow cylinder. The plurality of pairs of non-communicating recesses have one recess in communication with said hollow core of said piston, and said second recess communicating with said drainage channel.

In the annexed drawings:

FIG. 1 is an axial cross-sectional view of the valve showing the piston, cylinder, and the operating shift lever.

FIG. 2 is an end view of the cylinder showing the operating shift lever.

FIG. 3 is a sectional view of the piston and cylinder taken in the plane indicated by the line 3—3 of FIG. 1 when the operating shift lever is in the "Neutral" position.

FIG. 4 is a sectional view of the piston and cylinder taken in the plane indicated by the line 4—4.

FIG. 5 is a sectional view of the piston and cylinder taken in the plane indicated by the line 5—5.

FIG. 6 is an axial cross-sectional view of another valve showing a piston, cylinder and operating shift lever.

FIG. 7 is an isometric illustration of the valve of FIG. 1, showing the maximum positions of the operating shift lever in any one plane.

The valves of this invention are fabricated using conventional dimensional relationships between the parts, e.g. piston-cylinder tolerances for gas distributing valves, or hydraulic liquid distributing valves, as the case may be.

Referring more particularly to the embodiment of the valve shown in FIG. 1 the valve includes a cylinder 10 composed of a main cylinder 11, and terminal cylinder extensions 12 and 13 at the extremities of cylinder 10. The cylinder 10 is closed at one extremity by cylinder cap 14 having an air vent 15 located therein. Cylinder cap 14 and cylinder extension 12 are fastened to the main cylinder section 11 by fastening means, e.g. bolts 16. Located at the inner extremities of the main cylinder section 11 are circumferential flanges 17 and 18. Cylinder extensions 12 and 13 have cooperating complementary circumferential flanges 19 and 20, which coact with the circumferential flanges 17 and 18 respectively, leaving circumferential spaces 21 and 22 adapted to receive pliable sealing rings 23 and 24.

Located in the main cylinder section 11 in plane 3—3 FIG. 1 are ports 1, 2, 3 and 4, which as best shown in FIG. 3 are equally spaced around the outer circumference of the cylinder 10. Port 2 acts as a drainage port. Ports 5 and 6 are also located in the main cylinder section 11 intermediate the planes 4—4 and 5—5 of FIG. 1, which are axially displaced from each other and the plane 3—3, said ports 5 and 6 symmetrically disposed 120° apart. The ports 1, 2, 3, 4, 5 and 6 are threaded to receive plugs or fittings so that any one or number of ports can be used or closed as desired. Through such fittings lines communicating with pneumatic or hydraulic rams, not shown, may be attached to the valve-regulators hereof.

Cylinder head 25 having a centrally located piston rod bore 26 abuts the outer extremity of cylinder extension 13 closing the cylinder 10. Rotatable cylindrical sleeve 27 is provided with a circumferential flange 28 at one extremity which abuts cylinder head 25. A complementary coacting circumferential flange 29 of sleeve collar 30 holds the rotatable sleeve 27 in place and prevents axial displacement thereof while permitting rotation about the axis. Suitable fastening means, e.g. bolts 31 pass through the collar 30, cylinder head 25, cylinder extension 13, and are threadably fastened to the cylinder section 11. The various sections are locked together when bolts 31 are tightened. The cylindrical sleeve 27 has at its other extremity, a slotted cylindrical portion 32. In flush relation to this slotted portion 32 are extending operating shift lever pin supports 33 and 34 (FIG. 2).

The operating shift lever 35 is attached to the supports 33 and 34 by a pin 36 which extends through each support and the operating shift lever 35 and serves as a pivot for the operating shift lever 35. The bottom portion 37, of the shift lever 35, is slotted as at 38 to receive pin 39, which is attached to the rear portion 40 of the piston rod 41 which is bifurcated to accommodate bottom portion 37 of lever 35. The operating shift lever 35 as it is pushed to the forward position, or position B, FIG. 7, pivots on pin 36 and a backward movement is imparted to the piston rod 41. When the operating shift lever 35 is pulled backward, or to position G, FIG. 7, the piston rod 41 moves forward. When the shift lever 35 is axially rotated both the cylinder sleeve 27 and the piston rod 41 rotate, thereby effecting angular displacement of piston 60.

Located on the piston rod 41 are short circumferential e.g. 60° arc, indents 42, 43 and 44 which coact with a spring ball shift lever guide means 45 located in the cylinder head 25. The spring ball guide means 45 consists of a guide ball 46 coacting with indents or depressions 42, 43 and 44, and held in position by a biasing spring 47 which, in turn, is held in position by a threaded adjusting plug 48, said plug 48 also being useful to adjust the bias of spring 47. The axis of the spring ball means 48 is perpendicular to the longitudinal axis of the cylinder 10. The spacing of the indents 42, 43 and 44 is correlated to the actual spacing of the piston recesses with the axial location of the plane of cylinder ports 1, 2, 3 and 4, and the plane of ports 5 and 6. Spring ball shift lever guide means 49, similar to means 45 and also located in cylinder head 25, has its axis parallel to the axis of cylinder 10. Guide means 49 coacts with three indents 50, 51 and 52, located in the marginal flanged edge 28 of the cylinder sleeve 27. Indents 50, 51 and 52 are circumferentially spaced in correlation to piston recesses with various cylinder ports in a similar manner to that above indicated. Through the coaction of indents 42, 43 and 44, and indents 50, 51 and 52 with spring biased detents 46 and 53, the maximum axial and lateral shift lever positions in any one plane are determined. To limit the operating shift lever 35 in its rotation, a pin 54, FIG. 2, located in cylinder head 25, coacts with a short arcuate groove 55 located in the flange portion 28 of cylinder sleeve 27.

Lever 35, it should be understood, may be moved into any position within the quadrants defined by the planes intersecting at position N, one of the planes including maximum positions G, N and B, and the other plane including maximum positions D, N and E. For example, the shift lever 35 may occupy any position in the quadrant embracing positions G, F, D and N. Because of the ability to simultaneously, axially and angularly adjust the position of the piston 60, the operator is able to throttle fluid flow to a plurality of hydraulically fluid responsive motors, not shown, and thereby proportion the relative rates of action of such motors to any desired ratio from, e.g. 0:1 through 1:1 to 1:0. The same controlability is obtainable in each of the four quadrants shown in FIG. 7.

Slidably disposed in cylinder 10 is valve piston 60. Piston 60 has four principal portions including the piston rod 41, piston heads 61 and 62, and a piston connector portion 63. Piston heads 61 and 62 have similar diameters. Piston head 61, at one extremity, is attached to piston rod 41 which is of smaller diameter than piston head 61. The hollow core 64 of piston head 61 is plugged by piston rod 41. At the other extremity of piston head 61 is connector portion 63 which is provided with a pair of axial recesses 65 and 66 (FIG. 3) which, in combination with cylinder 10, define fluid chambers isolated from each other by piston web portion 67. Web portion 67 is provided at its opposite extremities with segments 68 and 69 disposed 180° apart. Segments 68 and 69 are so dimensioned and positioned as to seal off diametrically opposed ports in cylinder 10. Thus, when segments 68 and 69 are disposed in the position as shown in FIG. 3, fluid cannot flow through ports 3 and 4. Inlet port 1 is, however, in communication with hollow piston interior 70. Piston connector portion 63 is connected at its other extremity to piston head 62.

Piston 62 includes hollow bore 70 which is closed at one extremity by plug 71. Running longitudinally across the lower surface of piston head 62, starting from its connector portion extremity and extending to the arcuate recesses 8 and 8a of plane 5—5 is drainage channel 72. The piston bore 70 is used to transmit the fluid from ports 1, 3 and 4 to ports 5 and 6. Channel 72 is used to drain fluid from ports 5 and 6 to port 2. Located in piston 62 are two sets of fluid transmitting recesses 7 and 8 (FIGS. 4 and 5), and two sets of fluid drainage recesses 7a and 8a (FIGS. 4 and 5).

A cross section of piston 62 taken in the plane indicated by the line 4—4 is shown in FIG. 4. A pair of axial recesses 7 and 7a are isolated from each other by web portion 73 in combination with cylinder 10. Web portion 73 is provided at its extremities with segments 74 and 75 disposed approximately 90° apart. Recess 7 is open to the hollow bore 70, which permits communication between ports 1, 3, 4 and 5 in selectable order. Recess 7a is open to drainage channel 72 which permits communication between port 6 and drainage port 2. The cross section of piston 62 taken in the plane indicated by the line 5—5 is shown in FIG. 5. The configuration of web 76 is similar to web 73, but oppositely disposed with respect to that shown in FIG. 4. Here, recess 8 is open to the hollow bore 70 which permits coaction between ports 1, 3, 4 and 6 in selectable order. Recess 8a is open to drainage channel 72 permitting coaction between port 5 and drainage port 2. Listed below is a tabulation of different combinations of reacting cylinder ports in relation to the respective operating handle positions shown in FIG. 7:

| Operating Lever Position Fig. 7 | Communicating Pressurized Ports | Communicating Draining Ports |
| --- | --- | --- |
| A | 1, 4, 6 | 3, 5, 2 |
| B | 1, 6 | 5, 2 |
| C | 1, 3, 6 | 4, 5, 2 |
| D | 1, 4 | 3, 2 |
| N | | |
| E | 1, 3 | 4, 2 |
| F | 1, 4, 5 | 3, 6, 2 |
| G | 1, 5 | 6, 2 |
| H | 1, 3, 5 | 4, 6, 2 |

FIG. 6 shows another embodiment of the invention. Spring means 80 and 81 coact between the piston extremities 82 and 83 and the cylinder cap 84, and the cylinder head 85 respectively, to permit the piston 86 to be more easily shifted from one position to another. Oppositely turned upstanding spring portions 93 and 94 of spring 80, and located at the extremities of said spring 80, coact with spring retention recess 95 in the cylinder cap 84, and spring retention recess 96 in the cylinder face 82 respectively. Similar upstanding spring portions 97 and 98 of spring 81, and similarly located at the extremities of spring 81, coact with spring retention recess 99 in the piston face 83, and spring retention recess 100 in the cylinder head 85, respectively. Springs 80 and 81 coact to tend to restore the lever to neutral position N (FIG. 7).

The hollow piston extension 87 and piston rod 101 are fastened to opposite extremities of piston 102, pipe or nipple 87 communicating with hollow core 103. The piston recesses 88, 89 and 90 are essentially the same as the recesses in the piston of the valve shown in FIG. 1, and are adapted to coact between ports located in the plane J—J, e.g. drainage port 91, and the hollow piston extension 87 which acts as a fixed inlet or high pressure port. The operating shift lever, the lever supports the bifurcated piston rod portion, and the cylinder sections are basically the same as in the valve described in FIG. 1. Retention springs 80 and 81 are used in place of the spring ball guide means of the valve shown in FIG. 1.

The embodiment of the invention shown in FIG. 1 has a plurality of fluid ports, any of which ports may be used as an inlet or outlet. The embodiment shown in FIG. 6 has a combination of ports in coaction with a fixed inlet or outlet. The various parts of the valve, as can be seen, are easily manufactured and assembled. As seen from the drawings, the valve is cylindrical in shape. It is not bulky or cumbersome, thus permitting many valves, if needed, to be placed in a restricted area.

Valves constructed in accordance with this invention are useful in controlling the operation of a plurality of fluid or pneumatic activated piston-cylinder structures, motors or any devices that require hydraulic or pneumatic flow.

The devices can be controlled to coact and do useful work, e.g. in fork lift trucks, front end loaders, etc. where a variety of different actions are hydraulically or pneumatically performed at the command of an operator with a single regulating and distributing valve. The operator can control with one hand and one valve, devices which previously took the coordination of two valves and two hands.

Other modes of applying the principles of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. In a sliding piston distributing and regulating valve assembly including a hollow cylinder having ports in at least two transverse planes adapted for selective communication therein, a piston having a hollow core and a drainage channel extending longitudinaly along the surface of said piston, for communication between said port including planes, and means for rotating and axially sliding said piston, the improvement which includes:
   (a) said piston having a first pair of non-communicating, arcuate recesses adapted to communicate with said ports in a first one of said planes, one of said arcuate recesses communicating with said hollow core of said piston, and said second recess communicating with said drainage channel,
   (b) a plurality of pairs of non-communicating recesses, also in said piston, in a plurality of planes axially displaced from the plane of said first pair of arcuate recesses, each of the recesses in each pair being adapted to communicate with a single cylinder port in said hollow cylinder, and said plurality of pairs of non-communicating recesses each having one recess in combination with said hollow core of said piston, and the other recess communicating with said drainage channel.

2. In a sliding piston distributing and regulating valve assembly including a hollow cylinder having ports in at least two transverse planes adapted for selective communication therein, a piston having a hollow core and a drainage channel extending longitudinaly along the surface of said piston for communication between said port including planes, and means for rotating and axially sliding said piston, the improvement which includes:
   (a) said piston having a first pair of non-communicating, arcuate recesses adapted to communicate with said ports in a first one of said planes, one of said arcuate recesses communicating with said hollow core of said piston, and said second recess communicating with said drainage channel,
   (b) a plurality of pairs of non-communicating recesses, also in said piston, in a plurality of planes axially displaced from the plane of said first pair of arcuate recesses, each of the recesses in each pair being adapted to communicate with a single cylinder port in said hollow cylinder, and said plurality of pairs of non-communicating recesses each having one recess in communication with said hollow core of said piston, and the other recess communicating with said drainage channel, and
   (c) spring means for returning said piston to a neutral position.

3. A sliding piston distributing valve assembly in accordance with claim 2 wherein the spring means includes: coil springs disposed at each of the extremities of said piston, for coaction with the ends of the cylinder to control axial and rotary movement of said piston.

4. In a sliding piston distributing and regulating valve assembly including a hollow cylinder having ports communicating with the interior therein and disposed in two spaced transverse planes adapted for selective communication therein, a first one of said planes having four ports equally spaced therein, with one port being a drainage port, and the second one of said planes having two ports with symmetrically disposed axis 120° apart, a piston having a hollow transmitting core, and having a longitudinal drainage channel in the surface of said piston, for communication between said port including planes, and means for rotating and axially sliding said piston, the improvement which includes:
   (a) a first pair of non-communicating, diametrically opposed arcuate recesses in said piston adapted to coact with said four ports in said first plane, said recesses having an axial dimension in excess of the summation of the diameter of a cylinder port and the maximum stroke of said piston, and said recesses each encompassing more than 90° of arc, but less than 180° of arc, and separated by a web portion, including at its radial extremities, piston segments adapted to seal off diametrically opposed ports in said cylinder wall, and one arcuate recess communicating with said piston drainage channel and said drainage port, and the other said arcuate recess communicating with the hollow piston core and the remaining ports, in said first plane,
   (b) a second pair of non-communicating arcuate recesses axially displaced from said first pair of recesses for lever actuated coaction with two ports, in said second plane of said cylinder, said second pair of arcuate recesses being axially spaced from the second plane of ports, a distance equal to one-half the maximum stroke of said piston, when said piston is in the neutral position and said recess being separated by a web portion having at its extremities piston segments adapted to coact with the inner wall of said cylinder to isolate said ports, and one arcuate recess being in communication with the piston drainage channel and one port, and the other arcuate recess being in communication with the hollow fluid transmitting piston core and the remaining port,
   (c) a third pair of non-communicating, arcuate recesses axially displaced from said second pair of recesses and being equidistant from said second plane of ports when said piston is in the neutral position for lever actuated communication with the two ports in said second plane of said cylinder, and said recesses being separated by a web portion having at its extremities piston segments adapted to coact with the inner wall of said cylinder to isolate said ports, and one arcuate recess being in communication with the piston drainage channel and one port, and the other arcuate recess being in communication with the hollow fluid transmitting piston core and the remaining port, and
   (d) the web portions of the second and third pairs of non-communicating arcuate recesses have the same configuration but are oppositely disposed for alternate port coaction with the hollow fluid transmitting piston core and the piston drainage channel.

5. In a sliding piston distributing and regulating valve assembly including a hollow cylinder having ports communicating with the interior therein and disposed in two spaced transverse planes adapted for selective communication therein, a first one of said planes having four ports equally spaced therein, with one port being a drainage port, and the second one of said planes having two ports with symmetrically disposed axis 120° apart, a piston having a hollow transmitting core, and having a longitudinal drainage channel in the surface of said piston for communication between said port including planes, and means for rotating and axially sliding said piston, the improvement which includes:
   (a) a first pair of non-communicating, diametrically opopsed arcuate recesses in said piston adapted to coact with said four ports in said first plane, said recesses having an axial dimension in excess of the summation of the diameter of a cylinder port and the maximum stroke of said piston, and said recesses each encompassing more than 90° of arc, but less than 180° of arc, and separated by a web portion, including at its radial extremities, piston segments adapted to seal off diametrically opposed ports in said cylinder wall, and one arcuate recess communicating with said piston drainage channel and said drainage port, and the other said arcuate recess communicating with the hollow piston core and the remaining ports, in said first plane, (b) a second pair of non-communicating arcuate recesses axially displaced from said first pair of recesses for lever actuated coaction with two ports, in said second plane of said cylinder, said second pair of arcuate recesses being axially spaced from the second plane of ports, a distance equal to one-half the maximum stroke of said piston, when said piston is in the neutral position and said recesses being separated by a web portion having at its extremities piston segments adapted to coact with the inner wall of said cylinder to isolate said ports, and one arcuate recess being in communication with the piston drainage channel and one port, and the other arcuate recess being in communication with the hollow fluid transmitting piston core and the remaining port, (c) a third pair of non-communicating, arcuate recesses axially displaced from said second pair of recesses and being equidistant from said second plane of ports when said piston is in the neutral position for lever actuated communication with the two ports in said second plane of said cylinder, and said recesses being separated by a web portion having at its extremities piston segments adapted to coact with the inner wall of said cylinder to isolate said ports, and one arcuate recess being in comunication with the piston drainage channel and one port, and the other arcuate recess being in communication with the hollow fluid transmitting piston core and the remaining port, (d) the web portions of the second and third pairs of non-communicating arcuate recesses have the same configuration but are oppositely disposed for alternate port coaction with the hollow fluid transmitting piston core and the piston drainage channel, and (e) a piston rod attached to said piston at one extremity and having a bifurcated cylinder portion at its other extremity, said bifurcated cylinder having a pin located therein for cooperation with said operating means.

6. In a sliding piston distributing and regulating valve assembly including a hollow cylinder having ports communicating with the interior therein and disposed in two spaced transverse planes adapted for selective communication therein, a first one of said planes having four ports equally spaced therein, with one port being a drainage port, and the second one of said planes having two ports with symmetrically disposed axis 120° apart, a piston having a hollow transmitting core, and having a longitudinal drainage channel in the surface of said piston for communication between said port including planes, and means for rotating and axially sliding said piston, the improvement which includes:

(a) a first pair of non-communicating, diametrically opposed arcuate recesses in said piston adapted to coact with said four ports in said first plane, said recesses having an axial dimension in excess of the summation of the diameter of a cylinder port and the maximum stroke of said piston, and said recesses each encompassing more than 90° of arc, but less than 180° of arc, and separated by a web portion, including at its radial extremities, piston segments adapted to seal off diametrically opposing ports in said cylinder wall, and one arcuate recess communicating with said piston drainage channel and said drainage port, and the other said arcute recess communicating with the hollow piston core and the remaining ports, in said first plane, (b) a second pair of non-communicating arcuate recesses axially displaced from said first pair of recesses for lever actuated coaction with two ports, in said second plane of said cylinder, said second pair of arcuate recesses being axially spaced from the second plane of ports, a distance equal to one-half the maximum stroke of said piston, when said piston is in the neutral position and said recesses being separated by a web portion having at its extremities piston segments adapted to coact with the inner wall of said cylinder to isolate said ports, and one arcuate recess being in communication with the piston drainage channel and one port, and the other arcuate recess being in communication with the hollow fluid transmitting piston core and the remaining port.

(c) a third pair of non-communicating, arcuate recesses axially displaced from said second pair of recesses and being equidistant from said second plane of ports when said piston is in the neutral position for lever actuated communication with the two ports in said second plane of said cylinder, and said recess being separated by a web portion having at its extremities piston segments adapted to coact with the inner wall of said cylinder to isolate said ports, and one arcuate recess being in communication with the piston drainage channel and one port, and the other arcuate recess being in communication with the hollow fluid transmitting piston core and the remaining port, (d) the web portions of the second and third pairs of non-communicating arcuate recesses have the same configuration but are oppositely disposed for alternate port coaction with the hollow fluid transmitting piston core and the piston drainage channel, (e) a piston rod attached to said piston at one extremity and having a bifurcated cylinder portion at its other extremity, said bifurcated cylinder having a pin located therein for cooperation with said operating means, and (f) a slotted portion of an operating shift lever, said shift lever being attached to said cylinder by rotatable support means, and said support means further acting as a pivot for said shift lever for imparting axial movement to said piston, said axial and rotary movement of said piston being controlled by guide means.

7. In a sliding piston distributing and regulating valve assembly including a hollow cylinder having ports communicating with the interior therein and disposed in two spaced transverse planes adapted for selective communication therein, a first one of said planes having four ports equally spaced therein, with one port being a drainage port, and the second one of said planes having two ports with symmetrically disposed axis 120° apart, a piston having a hollow transmitting core, and having a longitudinal drainage channel in the surface of said piston for communication between said port including planes, and means for rotating and axially sliding said piston, the improvement which includes:

(a) a first pair of non-communicating, diametrically opposed arcuate recesses in said piston adapted to coact with said four ports in said first plane, said recesses having an axial dimension in excess of the summation of the diameter of a cylinder port and the maximum stroke of said piston, and said recesses each encompassing more than 90° of arc, but less than 180° of arc, and separated by a web portion, including at its radial extremities, piston segments adapted to seal off diametrically opposing ports in said cylinder wall, and one arcuate recess communicating with said piston drainage channel and said drainage port, and the other said arcuate recess communicating with the hollow piston core and the remaining ports, in said first plane, (b) a second pair of non-communicating arcuate recesses axially displaced from said first pair of recesses for lever actuated coaction with two ports, in said second plane of said cylinder, said second pair of arcuate recesses being axially spaced from the second plane of ports, a distance equal to one-half the maximum stroke of said piston, when said piston is in the neutral position and said recesses being separated by a web portion having at its extremities piston segments adapted to coact with the inner wall of said cylinder to isolate said ports, and one arcuate recess being in communication with the piston drainage channel and one port, and the other arcuate recess being in communication with the hollow fluid transmitting piston core and the remaining port, (c) a third pair of non-communicating, arcuate recesses axially displaced from said second pair of recesses and being equidistant from said second plane of ports when said piston is in the neutral position for lever actuated communication with the two ports in said second plane of said cylinder, and said recesses being separated by a web portion having at its extremities piston segments adapted to coact with the inner wall of said cylinder to isolate said ports, and one arcuate recess being in communication with the piston drainage channel and one port, and the other arcuate recess being in communication with the hollow fluid transmitting piston core and the remaining port, (d) the web portions of the second and third pairs of non-communicating arcuate recesses have the same configuration but are oppositely disposed for alternate port coaction with the hollow fluid transmitting piston core and the piston drainage channel, (e) a piston rod attached to said piston at one extremity and having a bifurcated cylinder portion at its other extremity, said bifurcated cylinder having a pin located therein for cooperation with said operating means, (f) a slotted portion of an operating shift lever, said shift lever being attached to said cylinder by rotatable support means, and said support means further acting as a pivot for said shift lever for imparting axial movement to said piston, said axial and rotary movement of said piston being controlled by guide means, and (g) a pair of similar spring ball guide means, each having a ball for coaction with locating indents, said ball being held in place by a biasing spring and an adjusting plug, said first guide having its axis perpendicular to the axis of said cylinder and coacting between the cylinder and indents on the piston, and said second guide means having its axis parallel to the axis of the cylinder and coacting between the cylinder and indents on the rotary shift lever support means.

8. In a sliding piston distributing and regulating valve assembly including a hollow cylinder having ports communicating with the interior therein and disposed in two spaced transverse planes adapted for selective communication therein, a first one of said planes having four ports equally spaced therein, with one port being a drainage port, and the second one of said planes having two ports with symmetrically disposed axis 120° apart, a piston having a hollow transmitting core, and having a longitudinal drainage channel in the surface of said piston for communication between said port including planes, and means for rotating and axially sliding said piston, the improvement which includes:

(a) a first pair of non-communicating, diametrically opposed arcuate recesses in said piston adapted to coact with said four ports in said first plane, said recesses having an axial dimension in excess of the summation of the diameter of a cylinder port and the maximum stroke of said piston, and said recesses each encompassing more than 90° of arc, but less than 180° of arc, and separated by a web portion, including at its radial extremities, piston segments adapted to seal off diametrically opposing ports in said cylinder wall, and one arcuate recess communicating with said piston drainage channel and said drainage port, and the other said arcuate recess communicating with the hollow piston core and the remaining ports, in said first plane, (b) a second pair of non-communicating arcuate recesses axially displaced from said first pair of recesses for lever actuated coaction with two ports, in said second plane of said cylinder, said second pair of arcuate recesses being axially spaced from the second plane of ports, a distance equal to one-half the maximum stroke of said piston, when said piston is in the neutral position and said recesses being separated by a web portion having at its extremities piston segments adapted to coact with the inner wall of said cylinder to isolate said ports, and one arcuate recess being in communication with the piston drainage channel and one port, and the other arcuate recess being in communication with the hollow fluid transmitting piston core and the remaining port, (c) a third pair of non-communicating, arcuate recesses axially displaced from said second pair of recesses and being equidistant from said second plane of ports when said piston is in the neutral position for lever actuated communication with the two ports in said second plane of said cylinder, and said recesses being separated by a web portion having at its extremities piston segments adapted to coact with the inner wall of said cylinder to isolate said ports, and one arcuate recess being in communication with the piston drainage channel and one port, and the other arcuate recess being in communication with the hollow fluid transmitting piston core and the remaining port, (d) the web portions of the second and third pairs of non-communicating arcuate recesses have the same configuration but are oppositely disposed for alternate port coaction with the hollow fluid transmitting piston core and the piston drainage channel, (e) a piston rod attached to said piston at one extremity and having a bifurcated cylinder portion at its other extremity, said bifurcated cylinder having a pin located therein for cooperation with said operating means, (f) a slotted portion of an operating shift lever, said shift lever being attached to said cylinder by rotatable support means, and said support means further acting as a pivot for said shift lever for imparting axial movement to said piston, said axial and rotary movement of said piston being controlled by guide means, and (g) spring means disposed at each of the exremities of said piston for coaction with the ends of the cylinder to control axial and rotary movement of said piston.

References Cited by the Examiner
UNITED STATES PATENTS

| | | | |
|---|---|---|---|
| 2,166,940 | 7/1939 | Conradson | 137—90 |
| 2,682,715 | 7/1954 | Walby | 137—636.4 |
| 2,911,006 | 11/1959 | Vogel | 137—625.17 |
| 2,953,164 | 9/1960 | Haberland | 137—625.17 |

FOREIGN PATENTS 865,785  4/1961  Great Britain.

M. CARY NELSON, *Primary Examiner.*

W. CLINE, *Examiner.*